3,300,395
NICKEL ELECTROPLATING BATHS AND PROCESSES

Gregor Michael, Dusseldorf, Herbert Frotscher, Dusseldorf-Benrath, Hans Markert, Dusseldorf, and Manfred Petzold, Dusseldorf-Hassels, Germany, assignors to Dehydag Deutsche Hydrierwerke G.m.b.H., Dusseldorf, Germany, a corporation of Germany
No Drawing. Filed Sept. 3, 1963, Ser. No. 306,319
Claims priority, application Germany, Sept. 5, 1962, D 39,772; July 25, 1963, D 42,092
15 Claims. (Cl. 204—49)

This invention relates to bright nickel electroplating baths and to leveling agents for such baths.

It has been found that nickel electroplating baths containing brightening agents and wetting agents can be imparted with leveling properties by the addition of cationic, salt-like condensation products of organic amides and oxo-compounds.

The condensation products which are employed in accordance with the present invention together with known nickel brightening agents, such as organic sulfonamides, disulfimides, sulfocarbonimides and their substitution products, halogen alkane sulfonic acids and the like, as well as their salts, are known reaction products of organic di- and poly-amides with oxo-compounds, especially with formaldehyde, for example, as they are described in Frotscher, Chemie und physikalische Chemie der Textilhilfsmittel, vol. 1, pp. 116, 131–136 (Verlag Technik, Berlin 1954).

Examples of di- and poly-amides which are capable of undergoing condensation are: urea, thiourea, alkylureas, alkylthioureas, methyleneurea, ethyleneurea, guanidine, biuret, dicyandiamide, dicyanidiamidine, alkylguanidine, also cyclic compounds such as methyldiaminotriazine, melamine, melam, melem, melon, ammeline, and the like. Oxo-compounds or substances which release oxo-compounds, which are useful for the production of the condensation products, are primary formaldehyde, paraformaldehyde, tetraoxymethylene, methylal, formaldehyde bisulfite, acetaldehyde, crotonaldehyde, benzaldehyde, acetone, acetophenone, cyclohexanone, and the like, but formaldehyde is of particular practical importance.

Furthermore, those cationic, salt-like condensation products which are built up from organic amides, oxo-compounds and condensable compounds containing phenolic groups may also be used as leveling agents. In this case it is also possible to modify the condensation products by condensing into them low molecular weight amino acids, such as glycocoll, alanine, serine, asparaginic acid, glutaminic acid, and the like, whereby products are obtained which improve the brightness depth distribution and depth distribution.

Suitable compounds which contain phenolic groups and may be condensed into the condensation products are mono- and poly-nuclear, simple and substituted, mono-valent and poly-valent phenols, aminophenols, aromatic hydroxy carboxylic acids, and the like, such as phenol, resorcinol, hydroquinone, phloroglucinol, naphthols, cresols, p-chlorophenol, p-aminophenol, salicylic acid, gallic acid, etc.

The leveling condensation products may essentially be employed in combination with all known nickel brightening agents, but with particular advantage in conjunction with organic sulfocarbonimides, such as N-acetyl-toluenesulfonamide, N-benzoyl-benzene-sulfonamide, N-acetyl-octylsulfonamide, N-toluylbutylsulfonamide, N-lauroyl-benzene-sulfonamide, N-benzoyl-cyclohexylsulfonamide, N,N'-bis-(p-toluenesulfonyl)-tartaric acid diamide, and N,N'-bis-(xylene-sulfonyl)-adipic acid diamide.

The condensation products may further be modified by the inclusion of low molecular weight amino acids, such as glycocoll, alanine, serine, asparaginic acid, glutaminic acid, and the like. This modification yields products which improve the brightness depth distribution and depth distribution of the nickel baths. The leveling effect of the baths is improved by concurrently using not only the condensation products, but also small amounts of alkylpyridinium halides (alkyl radical $C_2$–$C_{12}$), which do not affect the other properties of the bath.

The amounts in which the condensation products according to the present invention are added to the nickel baths lie between about 5 mgm. and 4 gm. per liter, preferably between 10 and 100 mgm./l. of bath fluid. The synergistically active alkylpyridinium halides are advantageously employed in an amount of 2 to 20 mgm./l. of bath fluid. The sulfocarbonimides, which are used with particular advantage as brightening agents, are employed in concentrations of 1 to 5 gm./l. of bath fluid. The wetting agents may be all petting agents customarily used for this purpose, preferably alkylsulfates or their salts (alkyl radicals $C_8$–$C_{18}$) in amounts of 0.1–0.5 gm./l. of bath fluid.

The nickel baths prepared with the condensation products according to the present invention and possibly modified with alkylpyridinium halides, possess excellent brightening effects as well as good leveling effects which remain unaltered even after long periods of operation. The baths are very robust in handling and do not exhibit any aging phenomena, such as damaging decomposition products, so that no activated charcoal purification is required. The consumption of leveling additives is very low and amounts to about 6–10 gm./10,000 ampere-hours of condensation product and about 0.7–1.5 gm./10,000 ampere-hours of alkylpyridinium halide.

The composition and method of operation of the baths according to the present invention are further illustrated by the following examples. However, the examples are not intended to be limitative.

EXAMPLES

For all of the following examples a nickel bath of the following basic composition was employed:

| | Gm./l. |
|---|---|
| Nickel sulfate $NiSO_4 \cdot 7H_2O$ | 270 |
| Nickel chloride $NiCl_2 \cdot 6H_2O$ | 50 |
| Boric acid $H_3BO_3$ | 30 |
| N-acetyl-toluene sulfonamide as the brightening agent | 3.5 |
| Decylsulfate as the wetting agent | 0.4 |

*Example 1*

When the basic composition nickel bath was modified wth 10–40 mgm./l. of a condensaton product of 1 mol of guanidine and 1 mol of formaldehyde, prepared in the presence of formic acid, bright, non-porous nickel electrodeposits with medium leveling effect were obtained at 45–60° C. and a current density of 0.1–8 amp./dm.$^2$.

When this bath was further modified with 2–5 mgm./l. of octylpyridiniumchloride, bright, non-porous nickel electrodeposits which also exhibited a good leveling effect were obtained under otherwise identical conditions.

The condensation product used herein was prepared by dissolving 90 gm. of guanidine carbonate in 100 gm. of an aqueous 30% formaldehyde solution while heating to 70° C. Thereafter, 60 gm. of 85% formic acid were stirred into the solution in such a manner that gas evolution remained within moderate limits. After completion of the adidtion of the formic acid, the mixture was stirred for 60 minutes at 80° C., whereby a clear, colorless, acid-reacting solution of the condensation product was obtained. For use in the electro-plating baths this solution, whose solids content is known, may be used as such, or the reaction product may previously be isolated, for example, by spray-drying.

Example II

30–60 mgm. of a condensation product of 1 mol of guanidine and 1.2 mol of formaldehyde, which was prepared in the presence of hydrochloric acid, and 2–8 mgm./l. of hexylpyridiniumbromide were added to a nickel bath having the basic composition described in Example I. At a temperature of 45–65° C. this bath produced full-bright, satisfactorily leveled, non-porous nickel electrodeposits in a current density range of 0.1–8 amp./dm.$^2$.

The condensation product which was employed in this run was prepared in a manner analogous to that described in Example I from 120 gm. of a 30% formaldehyde solution, 90 gm. of guanidinecarbonate and 100 gm. of hydrochloric acid having a specific weight of 1.16.

Example III

When 20–30 mgm./l. of a condensation product, prepared from 1 mol of dicyandimide and 1.5 mol of formaldehyde in the presence of formic acid, and 5–10 mgm./l. of ethylpyridiniumbromide were added to a nickel bath having the basic composition indicated in Example I, this bath produced non-porous, full-bright and satisfactorily leveled nickel electrodeposits at a temperature of 30–65° C. in a current density range of 0.2–8 amp./dm.$^2$.

The above indicated condensation product was obtained by reacting 84 gm. of dicyandiamide with 250 gm. of a 30% formaldehyde solution in the presence of 37 gm. of 85% formic acid at a temperature of 80–90° C. for 70–80 minutes.

Example IV

When 10–40 mgm./l. of a condensation product of 1 mol of guanidine hydrochloride and 1.2 mol of formaldehyde and 2–5 mgm./l. of decylpyridiniumchloride were added to the nickel bath having the basic composition indicated in Example I, this bath yielded non-porous, full-brght an satisfactorily leveled nickel electrodeposits at a temperature of 45–65° C. and in a current density range of 0.1–8 amp./dm.$^2$.

The condensation product used in this run was produced in a manner analogous to Example I from 97.5 gm. of guanidine hydrocholride and 120 gm. of a 30% formaldehyde solution.

Example V

When the nickel bath used in Example I was modified with 10–60 mgm./l. of a condensation product of one mol of guanidine, 1.2 mol of formaldehyde and 0.5 mol of glutanimic acid and 2–5 mgm./l of octylpyridinium bromide, this bath yielded fhll-bright, satisfactorily leveled nickel electrodeposits at a temperature of 30–60° C. and in a current density range of 0.1–8 amp./dm.$^2$.

The same result was obtained when the above-mentioned condensation product was replaced by an equal amount of a condensation product of 1 mol. of guanidine, 1.2 mol of formaldehyde and 0.5 mol. of glycocoll.

The condensation products above referred to were obtained by the method corresponding to that described in Example III from 90 gm. of guanidinecarbonate, 120 gm. of a 30% formaldehyde solution and 73 gm. of glutanimic acid or 37 gm. of glycocoll, respectively.

Example VI

When the nickel bath of Example I was modified with 20–40 mgm./l. of a product of condensation of 1 mol. of guanidine carbonate, 2.2 mol of formaldehyde and 0.5 mol of phenol in the presence of formic acid, full-bright, non-porous nickel electrodeposits with a very good leveling effect were obtained at 55–65° C. at pH values between 4.0 and 4.8 and in a current density range of 0.1–8 amp./dm.$^2$. When this bath was further modified with 2–6 mgm./l. of octylpyridiniumchloride, the leveling effect was still further increased.

The condensation product used in this run was prepared by dissolving 455 gm. of guanidine carbonate and 235 gm. of phenol in 1100 gm. of an aqueous 30% formaldehyde solution while warming to 80° C. Thereafter, 545 gm. of 85% formic acid were stirred into the solution in such a way that the gas evolution remained within moderate limits. After addition of the formic acid was complete, the mixture was stirred for 60 minutes at 80° C., whereby a clear, colorless, acid-reacting solution of the condensation product in the form of the corresponding formate was obtained. For use in the electroplating baths this solution, whose solids content is known, may be used as such, or the reaction product may previously be isolated, for instance, by spray drying.

Example VII

A nickel bath having the basic composition described in Example I was modified not only with 20–30 mgm. of a condensation product of 1 mol of guanidine carbonate, 2.2 mol of formaldehyde and 0.5 mol of p-aminophenolhydrochloride, which was prepared in the presence of formic acid, but also with 2–8 mgm./l. of ethylpyridinium bromide. At a temperature of 50–60° C. and at pH values of 3.8–5.1 this bath produced full-bright, very satisfactorily leveled, non-porous nickel electrodeposits within a current density range of 0.1–8 amp./dm.$^2$.

The condensation product used in this run was prepared in a manner analogous to that described in Example VI from 110 gm. of a 30% formaldehyde solution, 45.5 gm. of guanidine carbonate, a solution of 36.4 gm. of p-aminophenolhydrochloride in 110 gm. of water and 54.5 gm. of 85% formic acid.

An analogous result was obtained when the above-mentioned condensation product was replaced by an equal amount of a condensation product of 1 mol of guanidine carbonate, 2.2 mol of formaldehyde and 0.5 mol of p-chlorophenol.

Example VIII

When a nickel bath having the basic composition indicated in Example I was modified with 20–50 mgm./l. of a condensation product produced in the presence of formic acid from 0.5 mol of guanidine carbonate, 1.15 mol of formaldehyde and 0.4 mol of p-cresol, and with 4–8 mgm./l. of octylpyridiniumbromide, this bath produced non-porous, full-bright and satisfactorily leveled nickel electrodeposits at a temperature of 50–65° C. in a current density range of 0.1–8 amp./dm.$^2$.

The above indicated condensation product was obtained by reacting 45.5 gm. of guanidine carbonate and 43.2 gm. of p-cresol with 115 gm. of a 30% formaldehyde solution in the presence of 55 gm. of 85% formic acid at a temperature of 80° C. for 70–80 minutes.

The depth distribution was slightly improved by replacing the above condensation product by an equal amount of a condensation product of 0.5 mol of guanidine carbonate, 0.4 mol of p-cresol, 0.5 mol of glycocoll and 1.2 of formaldehyde.

Example IX

When a nickel bath having the basic composition indicated in Example I was modified with 30–60 mgm./l. of a condensation product of 1 mol of guanidine carbonate, 0.4 mol of salicylic acid and 2.2 mol of formaldehyde, and with 2–4 mgm./l. of octylpyridiniumchloride, this bath produced non-porous, full-bright and very satisfactorily leveled nickel electrodeposits at a temperature of 50–65° C. at pH values between 3.5 and 5.4 in a current density range of 0.1 to 8 amp./dm.$^2$ The condensation product used in this run was prepared in a manner analogous to that described in Example I from 455 gm. of guanidine carbonate, 276 gm. salicylic acid, 1100 gm. of a 30% formaldehyde solution and 815 gm. of 85% formic acid.

While certain specific examples and preferred modes of practice of the invention have been set forth it will be understood that this is solely for the purpose of illustration and that various changes and modifications may be made without departing from the spirit of the disclosure and the scope of the appended claims.

We claim:

1. A process for producing bright and level nickel electrodeposits which comprises passing current from an anode to a cathode to be plated through an aqueous acidic solution containing a brightening agents, a wetting agent, nickel ions and 5 mg. to 4 g./l. of a cationic, salt-like leveling agent formed by condensing a compound selected from the group consisting of urea, thiourea, alkylureas, methyleneurea, guanidine, biruet, dicyandiamide, alkyl guanidine, melamine, melam, melem, melon, ammeline and methyldiaminotriazine and salts thereof with an oxo compound selected from the group consisting of formaldehyde, paraformaldehyde, tetraoxymethylene, methylal, formaldehyde bisulfite, acetaldehyde, crotonaldehyde, benzaldehyde, acetone, acetophenone and cyclohexanone in the presence of an acid.

2. A nickel electroplating bath for obtaining bright and level electrodeposits comprising an aqueous acidic solution containing a brightening agent, a wetting agent, nickel ions and 5 mg. to 4 g./l. of a cationic, salt-like leveling agent formed by condensing a compound selected from the group consisting of urea, thiourea, alkylureas, methyleneurea, guanidine, biuret, dicyandiamide, alkyl guanidine, melamine, melam, melem, melon, ammeline and methyldiaminotriazine and salts thereof with an oxo compound selected from the group consisting of formaldehyde, paraformaldehyde, tetraoxymethylene, methylal, formaldehyde bisulfite, acetaldehyde, crotonaldehyde, benzaldehyde, acetone, acetophenone and cyclohexanone in the presence of an acid.

3. The process of claim 1 wherein the aqueous solution also contains an alkylpyridinium halide.

4. The process of claim 1 wherein the cationic compound has low molecular weight amino acid further condensed therewith.

5. The process of claim 1 wherein the brightening agent is a sulfocarbonamide.

6. The process of claim 1 wherein the cationic leveling agent has further condensed therewith mononuclear phenols which may have a substituent selected from the group consisting of lower alkyl, amino and carboxylic groups.

7. The bath of claim 2 wherein the catonic compound has further condensed therewith a low molecular weight amino acid.

8. The bath of claim 2 wherein the cationic leveling agent has further condensed therewith mononuclear phenols which may have a substituent selected from the group consisting of lower alkyl, amino and carboxylic groups.

9. The bath of claim 2 wherein the aqueous solution also contains an alkylpyridinium halide.

10. The bath of claim 2 wherein the brightening agent is a sulfocarbonamide.

11. The bath of claim 8 wherein the cationic compound has further condensed therewith a low molecular weight amino acid.

12. The process of claim 1 wherein said leveling agent is added in an amount from about 10 to 100 mgm./l. of bath fluid.

13. The process of claim 3 wherein said alkylpyridinium halide is added in an amount of from about 2 to 20 mgm./l. of bath fluid.

14. The bath of claim 2 wherein said leveling agent is added in an amount from about 10 to 100 mgm./l.

15. The bath of claim 9 wherein said alkylpyridinium halide is added in an amount from about 2 to 20 mgm./l. of the bath fluid.

References Cited by the Examiner

UNITED STATES PATENTS

| | | | |
|---|---|---|---|
| 2,485,149 | 10/1949 | Freed et al. | 204—49 |
| 2,773,818 | 12/1956 | Moy et al. | 204—49 |
| 2,870,069 | 1/1959 | Ostrow et al. | 204—49 |
| 3,116,225 | 12/1963 | Michael et al. | 204—49 |
| 3,170,853 | 2/1965 | Kroll | 204—49 |
| 3,190,821 | 6/1965 | Todt | 204—49 |

JOHN H. MACK, *Primary Examiner.*

G. KAPLAN, *Assistant Examiner.*